United States Patent [19]

Burkhardt et al.

[11] 3,998,981

[45] Dec. 21, 1976

[54] METHOD FOR PRODUCING A TIRE-MOUNTED ANTI-SKID DEVICE

[75] Inventors: Lieselotte Burkhardt, Bremerhaven; Wilhelm Schuster, Frankfurt am Main; Walter Stuck, Bremen-Beckedorf, all of Germany

[73] Assignee: Wolkro Aktiengesellschaft, c/o Firma Neofidaria AG, Zug, Switzerland

[22] Filed: Aug. 8, 1975

[21] Appl. No.: 603,023

[30] Foreign Application Priority Data

Aug. 14, 1974 Germany .......................... 2438925

[52] U.S. Cl. .............................. 427/171; 152/208; 152/216; 156/114; 156/181; 156/308; 156/165; 156/229; 156/315; 238/14; 427/381; 427/390 R; 427/412; 428/255; 428/288; 428/272; 428/290

[51] Int. Cl.² ................. B05C 3/107; B60C 11/00; C09J 5/04

[58] Field of Search .......... 427/302, 390, 322, 412, 427/333, 430, 337, 434, 377, 444, 381, 171, 372, 342; 106/36; 428/288, 395, 290, 396, 474, 255, 521, 272; 156/93, 308, 114, 314, 137, 316, 181, 319, 296, 334, 305, 315, 165, 229; 28/74 R; 238/14; 152/208, 168, 216, 185, 217, 187, 167, 190

[56] References Cited

UNITED STATES PATENTS

| | | | |
|---|---|---|---|
| 651,745 | 6/1900 | Caldwell et al. | 156/229 |
| 1,714,026 | 5/1929 | Humphries | 152/212 |
| 1,917,755 | 7/1933 | Dewey | 427/377 |
| 2,386,761 | 10/1945 | Wetherbee | 427/390 |
| 2,428,680 | 10/1947 | Piatak | 238/14 |
| 2,527,329 | 10/1950 | Powers et al. | 427/390 |
| 2,777,497 | 1/1957 | Hildebrant | 152/187 |
| 2,903,381 | 9/1959 | Schroeder | 427/390 R |
| 3,335,645 | 8/1967 | Eisenberg | 238/14 |
| 3,686,017 | 8/1972 | Menikheim et al. | 427/302 |

OTHER PUBLICATIONS

Blow (editor) "Rubber Technology and Manufacture" c. 1971, pp. 283–285 and 399–400.

*Primary Examiner*—William A. Powell
*Assistant Examiner*—J. J. Gallagher
*Attorney, Agent, or Firm*—Kurt Kelman

[57] ABSTRACT

An endless tire-mounted anti-skid belt is produced by spreading an endless fibrous mesh to the diameter of the vehicle tire on which the belt is to be mounted, impregnating the spread endless mesh with a hot-vulcanizable elastomer dissolved in a solvent, drying the impregnated spread endless mesh until at least 80% of the solvent has been removed, repeating the impregnation and drying steps several times until a desired thickness of elastomer has been deposited on the spread endless mesh, and curing the elastomer by vulcanization in an autoclave under hot steam.

6 Claims, No Drawings

METHOD FOR PRODUCING A TIRE-MOUNTED ANTI-SKID DEVICE

The invention relates to a method for the production of endless anti-skid belts for mounting on vehicle tires.

Numerous devices are known for counteracting slipping or bad gripping of a vehicle tire in bad street or road conditions. In most cases, a snow chain provided with steel members is used for this purpose, which however has numerous disadvantages. A metallic snow chain, whatever its construction, is always liable to cause damage to the tire, vehicle and road.

Since metallic snow chains are practically non-elastic they do not remain tight on the tires at high speeds, and thus easily result in the wheels being out of balance. Moreover, snow chains allow only a low travelling speed so that frequently, more particularly in portions of the road which are free of snow, slow-moving vehicles fitted with snow chains disturb the traffic flow and cause drivers who are travelling without snow chains to perform hazardous overtaking procedures. Furthermore, not only is the travelling attitude or "feel" of the vehicle essentially impaired by metallic snow chains, but extremely disturbing travelling noises occur. Metallic snow chains which usually are not manufactured from stainless steel are also subject to premature corrosion, mainly due to the action of distributed salt. Moreover, their useful life when used on snow-free roads is often only 50 to 100 kilometers since the chain members provided at their running surfaces rapidly wear away. It is furthermore known that when breakages of the members of metallic snow chains occur, brake hoses of the vehicles can be destroyed and wheel boxes and mudguards can be damaged.

In order to avoid these disadvantages, an anti-skid device for tires has been proposed, the side parts of which consist of a steel chain and the running surface of which is formed of synthetic resin or rubber. Such a construction has the disadvantage that the rivetted connection of metal to plastics or rubber tears out, so that the device is destroyed and similar damage as mentioned above can occur.

Finally, an anti-skid, tire mounted device is known which is of mesh-like construction and consists of fibres which are coated with synthetic resin or rubber. Such a device runs much more quietly than known snow chains and hardly impairs the travelling attitude of the vehicle. Moreover, neither damage to the vehicle nor of the road occurs, when the device is in use.

It has however been shown that such a synthetic resin or rubber coated fibre mesh does not satisfy the requirements for a tire-mounted anti-skid device, since it is neither stable in shape nor resistant to wear. The device drawn onto the tire lengthens during travelling on dry roads, leading to formation of bulges at the periphery and to the danger of the mesh structure of the endless anti-skid device hooking onto projecting vehicle parts, for example in the region of the brake fittings. Moreover, in the known synthetic resin fibre meshes, the coating separates quickly and leaves the fibres lying thereunder free. These uncoated fibres are then worn through in a very short time, especially on snow-free roads, so that the device is destroyed. In practical tests, it has furthermore been shown that the outer diameter in the region of the running surface becomes enlarged by up to 20% of its original periphery whereby the device becomes unusable.

It is an object of the invention to provide a method for the production of an endless anti-skid device for mounting on vehicle tires, in which a synthetic resin coated fibre mesh is obtained, which has all of the advantages but none of the disadvantages of the known anti-skid devices, and moreover remains stable in shape and dimensions even at high travelling speeds and has an essentially longer life than the known devices of this kind.

The invention consists in a method for the production of an endless anti-skid device for mounting on vehicle tires, wherein an endless mesh structure of synthetic fibres is spread to the required wheel diameter and in this condition is completely immersed in hot-vulcanisable elastomer dissolved in solvents in an impregnation bath and thus impregnated until all fibre interstices are filled, then removed from the impregnation bath and stored in the air until at least 80% of the solvent proportion has evaporated, this procedure being repeated a number of times until the desired layer thickness is formed, whereafter the spread mesh or mesh-like structure is treated in a hot steam autoclave and the elastomer thereby cured by vulcanisation and simultaneously the fibres are thermofixed.

The treatment in the hot steam autoclave preferably takes place under pressure, at 140° C. Advantageously, a wetting agent such as fluorocarbonic acid is added to the impregnation bath. The synthetic fibres may be treated with a de-sizing solvent before the impregnation procedure, and a wetting agent may be added to the solvent of the elastomer. Finally the fibres may be treated with a bond promoting agent after de-sizing.

In an embodiment of the method of the invention, given by way of example, polyamide 66 is used as the synthetic fibre. A mesh or mesh-like structure produced from this fibre is cut to a length which is smaller than the corresponding desired wheel periphery. The two ends of the mesh web are joined together, for example by sewing, and the mesh thus made endless. The endless mesh is then spread to the desired wheel diameter size and in this condition is placed in an impregnation bath and kept immersed therein until the hot-vulcanisable elastomer dissolved in a liquid solvent in the impregnation bath has filled all of the fibre interstices. The impregnated mesh is then stored in the air until at least 80% of the solvent proportion has evaporated. The impregnation and drying procedure is repeated until a sufficiently thick elastomer layer has been deposited on all sides of the individual fibre strips. After the last impregnation procedure and evaporation of at least 80% of the original solvent proportion, the coated mesh is treated in the spread condition in a hot steam autoclave. It has been found that under the influence of steam and pressure at a temperature of about 140° C, the elastomer is particularly well pretreated for the desired purpose and is vulcanised. It is thereby avoided that during heating, the solvent in the elastomer coating spontaneously evaporates causing a sponge rubberlike covering which would be completely unusable as an anti-skid device. Under the steam pressure existing in the autoclave, the residual solvent quantities remain dissolved in liquid form in the elastomer and only later, after the elastomer has been cured and has reached a sufficient strength, can any solvent diffuse out after depressurising of the autoclave. The cured elastomer is thus no longer damaged.

It has been found that in the treatment in the hot steam autoclave, a thermofixing of the fibres occurs during the vulcanising of the elastomer. This produces in a single working operation, with simultaneous curing of the elastomer and thermofixing of the fibres, a completely stress-free compound product which is durable even under the rough handling to which an anti-skid device mounted on vehicle tires is subjected to.

Tests have shown that more particularly the first immersion step can be substantially accelerated if the relatively viscous immersion solution has a wetting agent, for example fluorocarbonic acid, added to it.

It has been found to be particularly advantageous if the synthetic fibres forming the mesh are treated with a de-sizing solvent before the impregnation procedure, and that a wetting agent is added to this solvent, of which a portion remains adhering to the fibres after the removal of the remainder of the solvent.

In order to further improve the adhesion between synthetic fibres and vulcanised elastomer, the fibres may be treated with a bond promoting agent at their surface, before the impregnation procedure.

The anti-skid devices produced according to the method of the invention have been tested in large numbers under extremely bad road and street conditions in snow, on ice and in muddy or sandy ground. In tests, speeds between 80 and 100 kilometers per hour were travelled on dry roads, and distances up to 1000 kilometers covered without destruction of the devices. On one test stretch, a speed of 160 kilometers per hour was travelled for a short time, no abnormal impairment of the travelling attitude of the vehicle being found.

Further special features of a tire-mounted anti-skid device produced by the method according to the invention, are not only the absolute quietness of running, the good travelling attitude and the protection of the tires, vehicle and road, but moreover the reliability of the device. The device remained dimensionally stable even after it had been worn down to an extent of one half of its original thickness.

What we claim is:

1. A method for the production of an endless anti-skid device for mounting on vehicle tires of a predetermined diameter, comprising the steps of
   1. spreading an endless mesh structure of synthetic fibers defining a multiplicity of interstices, the diameter of the endless mesh structure being less than the predetermined diameter of the vehicle tires, to the diameter of the vehicle tires,
   2. completely immersing the spread endless mesh structure in an impregnation bath of a hot-vulcanizable elastomer dissolved in a solvent until all the interstices of the mesh structure are filled,
   3. removing the impregnated endless mesh structure from the impregnation bath,
   4. storing the impregnated spread endless mesh structure in the air until at least 80% of the solvent has evaporated,
   5. repeating steps (2), (3) and (4) a number of times until a desired thickness of elastomer has been deposited on the spread mesh structure, and
   6. placing the spread and impregnated endless mesh structure in an autoclave and treating it with hot steam to cure the elastomer by vulcanization and fix the fibers in position in the cured elastomer.

2. The production method of claim 1, wherein the treatment in the autoclave is performed at a temperature of 140° C and under superatmospheric pressure.

3. The production method of claim 1, further comprising the step of adding a wetting agent to the impregnation bath.

4. The production of claim 3, wherein the wetting agent is fluorocarbonic acid.

5. The production method of claim 1, further comprising the steps of treating the synthetic fibers with a desizing solvent before immersing the mesh structure in the impregnation bath, and adding to the solvent a wetting agent which partly adheres to the fibers after the solvent has evaporated.

6. The production method of claim 5, further comprising the step of treating the synthetic fibers with a bond promoting agent after desizing.

* * * * *